(12) United States Patent
Jaeger (10) Patent No.: US 8,246,473 B2
(45) Date of Patent: Aug. 21, 2012

(54) UNIVERSAL JOINT WITH IMPROVED BALL LUBRICATION

(75) Inventor: Daryl J. Jaeger, Kewaskum, WI (US)

(73) Assignee: Weasler Engineering, Inc., West Bend, WI (US)

( * ) Notice: Subject to any disclaimer, the term of this patent is extended or adjusted under 35 U.S.C. 154(b) by 211 days.

(21) Appl. No.: 12/602,735

(22) PCT Filed: Jun. 4, 2008

(86) PCT No.: PCT/US2008/065741
§ 371 (c)(1),
(2), (4) Date: May 27, 2010

(87) PCT Pub. No.: WO2008/151223
PCT Pub. Date: Dec. 11, 2008

(65) Prior Publication Data
US 2010/0292013 A1    Nov. 18, 2010

Related U.S. Application Data

(60) Provisional application No. 60/942,089, filed on Jun. 5, 2007.

(51) Int. Cl.
*F16C 1/24* (2006.01)

(52) U.S. Cl. ............... 464/11; 464/118; 464/171
(58) Field of Classification Search .......... 464/7, 11–14, 464/117, 118, 905, 171
See application file for complete search history.

(56) References Cited

U.S. PATENT DOCUMENTS

| 1,717,481 | A | 6/1929 | Warner |
| 3,470,712 | A | 10/1969 | Geisthoff et al. |
| 4,781,662 | A | 11/1988 | Mayhew et al. |
| 6,840,864 | B2 | 1/2005 | Dupuie et al. |
| 6,863,615 | B2 | 3/2005 | Herchenbach et al. |

OTHER PUBLICATIONS

International Search Report and Written Opinion as mailed on Sep. 22, 2008 for International Patent Application PCT/US2008/065741.

*Primary Examiner* — Gregory Binda
(74) *Attorney, Agent, or Firm* — Quarles & Brady LLP (57) ABSTRACT

A universal joint with improved ball lubrication, the improvement wherein each yoke has a ball head at an inward end of the yoke, the centering plate has a tube in which the ball heads of the yokes are slideably received to establish a slideable connection between the ends of the yokes and the centering plate, and the lubricant is supplied from the second passageway to an interior of the tube. A shield substantially encloses the joint in combination with the tractor master shield and has lubrication fitting access holes.

4 Claims, 6 Drawing Sheets

UNIVERSAL JOINT WITH IMPROVED BALL LUBRICATION

CROSS-REFERENCE TO RELATED APPLICATIONS

This application claims the benefit of PCT International Application No. PCT/US2008/065741 filed on Jun. 4, 2008, which claims the benefit of U.S. Provisional Patent Application 60/942,089 filed on Jun. 5, 2007, which is incorporated by reference herein.

STATEMENT CONCERNING FEDERALLY SPONSORED RESEARCH OR DEVELOPMENT

Not applicable.

FIELD OF THE INVENTION

This invention relates to a universal joint with an improved ball lubrication system.

BACKGROUND OF THE INVENTION

Universal joints are commonly used in automotive, agricultural, aeronautical, and industrial applications to couple two rotary shafts that have an angular misalignment along the axis of rotation of each shaft. One type of universal joint is aptly referred to as a constant velocity (CV) universal joint. A CV universal joint operates to minimize the rotational variations between drive and driven shafts at an angle to one another. A typical CV universal joint comprises a housing, a pair of yokes, a pair of cross members with each cross member pivotally connecting one of the yokes to one of the ends of the housing, and a centering apparatus orbitally mounted in the housing between the yokes. A drive shaft is connected to one of the yokes and the driven shaft is connected to the other yoke. The centering apparatus operates to equalize the angles between the drive shaft and housing, and the driven shaft and housing, thus providing a near constant velocity ratio between the drive and the driven shafts.

Repeated metal-to-metal sliding contact within the centering apparatus has presented a challenge in prior universal joints. Lubrication has been the most prevalent solution, however, it is difficult to ensure the lubrication is both applied in the proper location and remains in that location during operation of the universal joint. Under general operation, centrifugal forces act on the lubricant and tend to displace the lubricant radially outward from the center of rotation. See, for example, U.S. Pat. No. 4,781,662 issued to Mayhew et al., which is hereby incorporated by reference in its entirety.

SUMMARY OF THE INVENTION

The invention provides a universal joint with improved ball lubrication for coupling a pair of shafts having an angular misalignment between them. The universal joint has a first yoke with a first axis of rotation and a second yoke with a second axis of rotation. A housing pivotally connects the yokes with a pair of cross members, one for each yoke. A centering plate is orbitally mounted in the housing between the yokes and is slideably connected to an end of each yoke. A lubrication passageway includes an arcuate groove in the first yoke which is in a first plane spaced apart from the first axis of rotation and perpendicular to an imaginary line which is normal to the first axis of rotation. The arcuate groove has an entry portion on one side of a second plane which is normal to the first axis of rotation and which intersects the groove where the groove is farthest from the first axis of rotation. The entry portion is in communication with a first passageway for providing lubricant to the groove. The groove has an exit portion on the other side of the second plane. The exit portion is in communication with a second passageway extending radially inward from the groove delivering lubricant to a sliding surface radially inward from the groove. Additionally, each yoke has a ball head at an inward end of the yoke. The centering plate has a tube in which the ball heads of the yokes are slideably received to establish a slideable connection between the ends of the yokes and the centering plate. Lubricant is supplied from the second passageway to an interior of the tube. As the universal joint rotates, the groove in the first yoke inhibits the flow of lubricant towards the entry portion from the interior of the tube. Therefore, the groove helps prevent running the universal joint without lubricant in the tube.

In another aspect, the invention provides a shield including a bell member and a sleeve member, with the bell member substantially closing one end of the shield and articulated to the sleeve member by mating part spherical surfaces between the bell member and the sleeve member. A bearing resides between the sleeve member and an outer perimeter of the housing and another bearing is between the bell member and the first yoke to substantially enclose the joint, in combination with the tractor master shield that closes the open end of the shield, to help prevent debris from fouling the sliding surfaces of the joint. Preferably, the shield has at least one hole in it for accessing one or more lubrication fittings of the universal joint.

It is therefore a primary advantage of the invention to provide a universal joint with a lubrication system that impedes the flow of lubricant away from the interior of the tube of a centering apparatus.

It is a further advantage of the invention to provide a universal joint in which the interior of the tube of a centering apparatus is easily lubricated.

It is another advantage of the invention to provide protection against dust, dirt and debris adversely affecting the operation of the universal joint.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
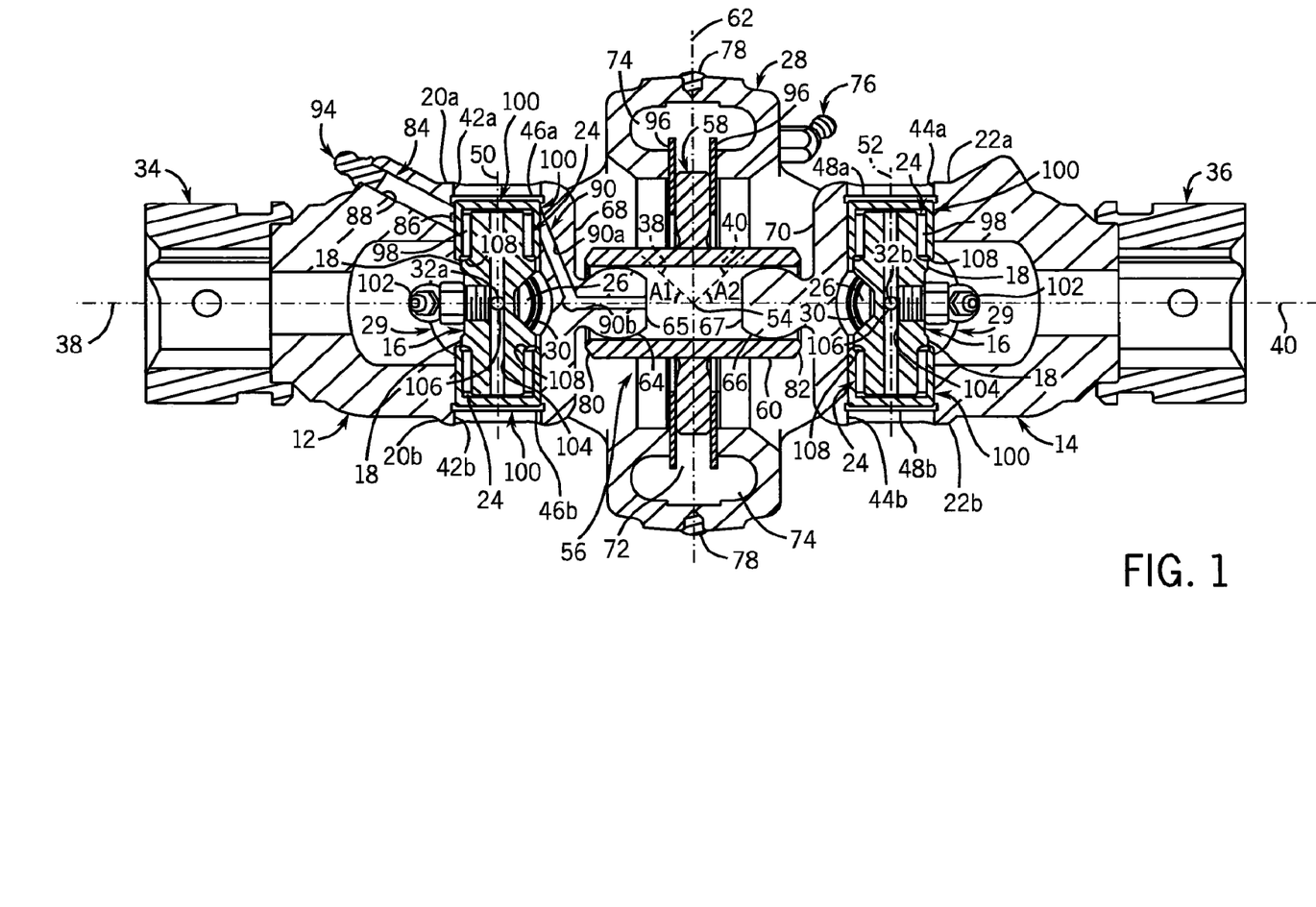
FIG. 1 is a side plan view partially in section illustrating an embodiment of a universal joint in accordance with the present invention, the joint being shown in an aligned position.

FIG. 1 illustrates a universal joint 10 of the present invention. The universal joint 10 is an 80 degree constant velocity type incorporating a first yoke 12 and a second yoke 14. Each one of a pair of cross members 16 has opposed trunnions 18. The trunnions 18 of the left cross member 16 are journalled in the arms 20a, 20b of the first yoke 12 and the trunnions 18 of the right cross member 16 are journalled in the arms 22a, 22b of the second yoke 14 by suitable bearings 24. Each cross member 16 also has a pair of opposed trunnions 26, each of which are journalled in one of the ends of a double inner housing 28 by suitable bearings 30 to rotate about respective through-bore axes 32a, 32b.

Figure 3:
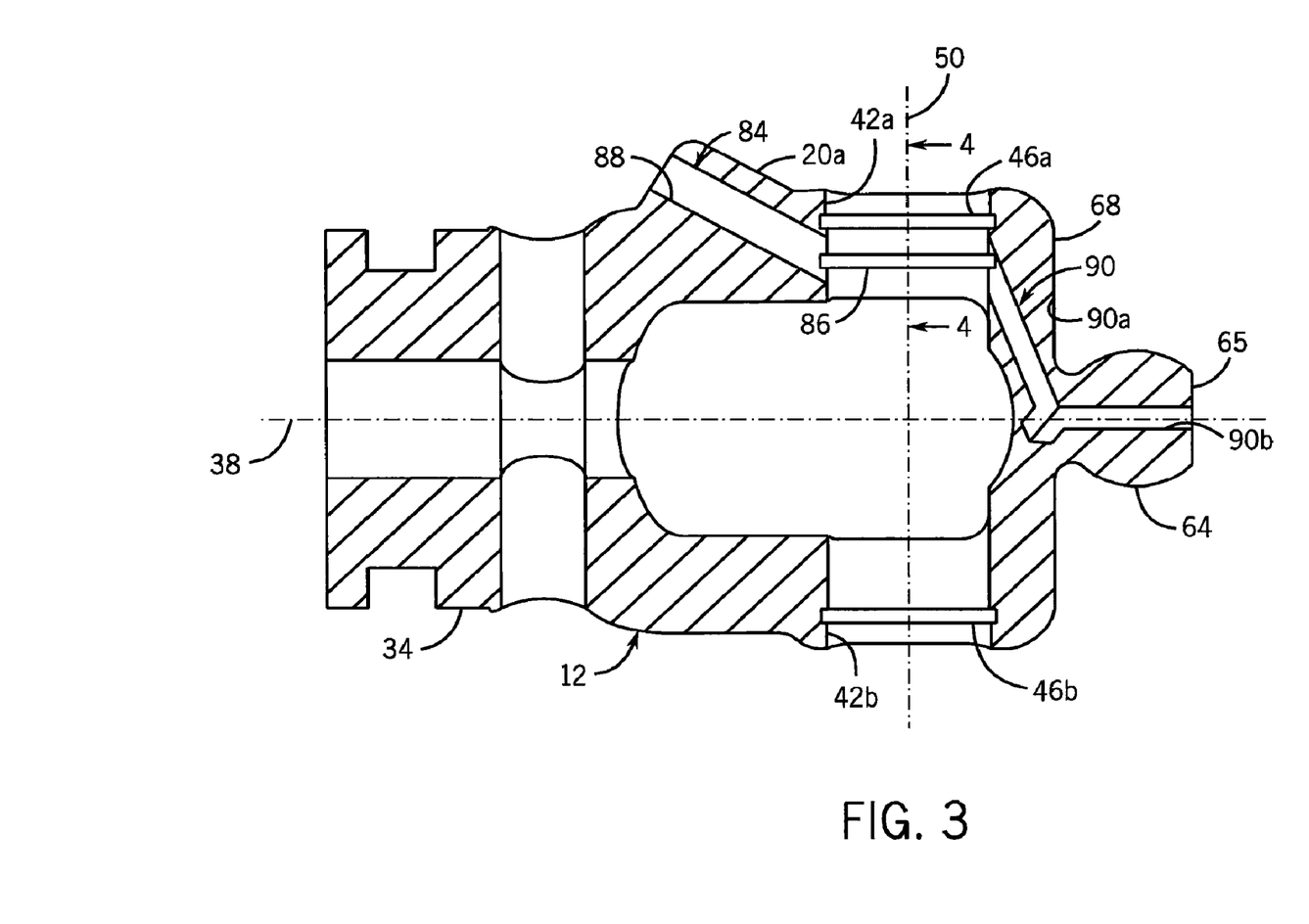
FIG. 3 is a section view along line 3-3 of FIG. 2.

The arms 20a, 20b, 22a, 22b of each yoke 12, 14 are spaced apart from one another and extend from a respective collar 34, 36 which are for connecting the respective yoke 12, 14 to a respective shaft (not shown). The collar 34, 36 may be connected to the yoke 12, 14, as illustrated in FIG. 1, or be integral with the yoke 12, 14 as shown in FIG. 3. The collar 34 therefore defines a shaft axis 38 and the collar 36 defines a shaft axis 40. Each arm 20a, 20b, 22a, 22b has a bearing race receiving through-bore 42a, 42b, 44a, 44b therein to receive the bearings 24 in a slight press fit. An annular groove 46a, 46b, 48a, 48b is provided in each respective through-bore 42a, 42b, 44a, 44b to receive a snap-ring (not shown) to also hold the bearings 24 in the arms 20a, 20b, 22a, 22b. The through-bores 42a, 42b are axially aligned with one another along a first yoke axis 50 and through-bores 44a, 44b are axially aligned with one another along second yoke axis 52. The first yoke axis 50 is perpendicular to shaft axis 38 and the second yoke axis 52 is perpendicular to the shaft axis 40.

As best illustrated in FIG. 1, cross members 16 are journalled into respective through-bores in either the arms 20a, 20b, 22a, 22b or the one of the ends of the double inner housing 28. The double inner housing 28 is substantially symmetric about a plane defined by the housing axis 54 and the radial axis 62 as viewed in FIG. 1, except for the lubrication fitting 76 only appears as shown in FIG. 1. The mounting and configuration of each bearing 24, 30 is identical in the respective yoke 12, 14 or housing 28. The bearing 24, 30 is typically a needle bearing including needle rollers 98, a bearing cup or race 100, and gasket 108 to journal one of a respective pair of trunnions 18 of each cross member 16 in arms 29 on the ends of the double inner housing 28 and each one of the other pair of trunnions 18 in the arms 20a, 20b, 22a, 22b of the respective yoke 12, 14. Therefore, there are a total of eight bearings 24, 30, four for each cross member 16. The bearing cup 100 houses the needle rollers 98 and is press fit into the respective through-bores 42a, 42b, 44a, 44b (and four similar through-bores in the four arms 29 of the double inner housing 28). Each of the bearings 24, 30 is held in place with a snap-ring (not shown) in a groove 46a, 46b, 48a, 48b (and four similar grooves in the four arms 29 of the double inner housing 28) around the outside of the bearing cup 100.

Lubricant enters the cross members 16 through lubrication fittings 102, with one fitting 102 supplying the cross member 16 in the first yoke 12 and the other fitting 102 supplying the cross member 16 of the second yoke 14. Upon entering the cross member 16, lubricant flows into a first bore 104 and a second bore 106. The first bore 104 of the first yoke 12 is collinear with the first yoke axis 50, and the first bore 104 of the second yoke 14 is collinear with the second yoke axis 52. The second bore 106 of the first yoke 12 perpendicularly intersects the first bore 104 of the first yoke 12, and the second bore 106 of the second yoke 14 perpendicularly intersects the first bore 104 of the second yoke 14. As the lubricant is pumped, if flows radially outward through the bores 104, 106 until it reaches the respective bearing cups 100. The lubricant then flows through a narrow gap between the distal end of the trunnions 18 and the bearing cups 100 and into the bearings 24, 30 to lubricate the bearings 24, 30 during operation. Gaskets 108 circumscribe the outer surface of the trunnions 18 to prevent the lubricant from exiting from between the bearing cups 100 and trunnions 18. Because the fittings 102 are radially inward, centrifugal force tends to urge the lubricant from the fittings 102 to the distal ends of the cross members 16.

Each yoke 12, 14 includes a spherical ball 64, 66 extending from a bridge 68, 70 located away from the respective collars 34, 36 at an inward end of the yoke 12, 14. Each bridge 68, 70 joins the arms of the respective yoke 12, 14 on the side of the through-bores 42a, 42b, 44a, 44b opposite the respective collars 34, 36. The balls have a flat distal end 65, 67 as viewed in FIG. 1. The spherical outer surface of the ball 64, 66 is sufficient to accommodate the extreme positions of the yokes 12, 14, that is, the spherical outer surface of the ball 64, 66 will slide along the interior of the tube 60 of a centering apparatus 56 (discussed in detail below) even when the yokes 12, 14 are in extreme orientations.

A drive shaft (not shown), such as the drive shaft of a transmission, is coupled to one of the collars 34, 36, and the shaft to be driven (not shown) is coupled to the other collar 34, 36. The collars 34, 36 shown in FIG. 1 have internal splines but could just as well have external splines or some other means for coupling the yokes 12, 14 to the respective drive and driven shafts. When the drive shaft and the driven shaft are misaligned, the rotational velocity of the driven shaft will equal the rotational velocity of the drive shaft only if the angle A1 between the shaft axis 38 and housing axis 54 and angle A2 between the shaft axis 40 and housing axis 54 are equal (represented in a misaligned configuration by dashed shaft axis 38, 40 lines in FIG. 1).

A centering apparatus 56 provides a connection between the yokes 12, 14 to insure that the angles A1, A2 will be equal as the drive shaft rotates the driven shaft. The centering apparatus 56 includes a circular centering plate 58 which is restrained against axial movement along the housing axis 54, but can move radially within the double inner housing 28 intermediate of the yokes 12, 14. The centering plate 58 has a tube 60 oriented perpendicular to a radial axis 62 and coaxial or parallel with the housing axis 54 depending upon the positioning (i.e., angular alignment) of the yokes 12, 14. The interior of the tube 60 is sized to receive the balls 64, 66 from the respective yokes 12, 14 in a close sliding fit.

The centering plate 58 is restrained against axial movement but allowed to move radially by being positioned in an annular raceway 72 defined by the double inner housing 28 intermediate of the yokes 12, 14. Radially outward of the raceway 72, a grease reservoir 74 is provided for storage of lubricant and a lubrication fitting 76 is provided to replenish the lubricant in the reservoir 74 from the outside of the double inner housing 28. The raceway 72 is readily formed by conventional machining techniques if the double inner housing 28 is made in two halves which are then welded together as shown by the weld bead 78.

An annular wear plate 96 is provided on each side of the centering plate 58 and floats in the raceway 72 to close off the raceway 72 from dirt and debris in all positions of operation. The wear plates 96 are also free to rotate to distribute wear evenly around the entire plate. The centering plate 58 is thicker adjacent to the outer periphery to reduce the amount of machining of wearing surfaces that must be performed. The centering plate 58 could be made with a radial hole extending from the outer diameter surface of the plate 58 to the inside diameter surface of the tube 60 to allow the housing 28 to be lubricated without using or having fitting 76.

The tube 60 is preferably integral with the centering plate 58 for strength and is preferably circular cylindrical. The tube 60 projects far enough from each side of the centering plate 58 to provide adequate clearance between the balls 64, 66 of the respective yokes 12, 14 when the balls 64, 66 are slid into the tube 60 and during operation of the universal joint 10. The tube 60 includes beveled edges 80, 82 on the outside distal surface which provide clearance for the bridges 68, 70 when the yokes 12, 14 are in extreme orientations. For example, each yoke 12, 14 is capable of being displaced approximately 40 degrees in either direction from the housing axis 54, for a total of 80 degrees of angular displacement. Also note that the double inner housing 28 is contoured to provide sufficient clearance for the bridges 68, 70 of the yokes 12, 14 when in the extreme orientations.

Figure 2:
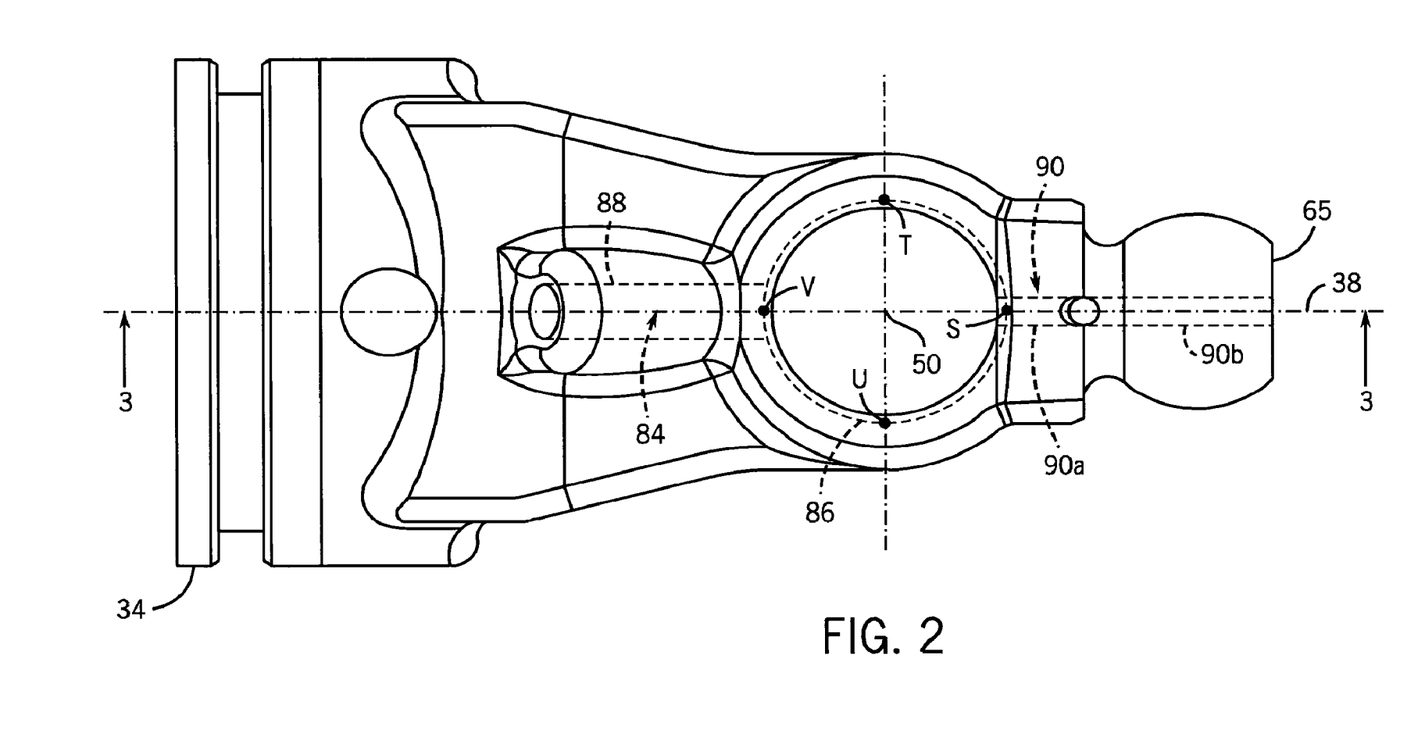
FIG. 2 is a top view of a yoke in accordance with an embodiment of the present invention.

Yoke 12 differs from yoke 14 because a lubrication passageway 84 is provided in yoke 12. Referring to FIGS. 2 and 3, the passageway 84 includes an arcuate, annular groove 86 in the through-bore 42a which is radially inward from the annular groove 46a for the snap-ring (not shown). The groove 86 is coaxial with the first yoke axis 50 and in a plane which is perpendicular to the plane defined by the shaft axis 38 and the first yoke axis 50.

The lubrication passageway 84 also includes two bores 88, 90. The first bore 88 is in the plane defined by the shaft axis 38 and the first yoke axis 50. The first bore 88 slopes radially inward at an angle of approximately 30 degrees to the shaft axis 38 through the arm 20a. The first bore 88 provides communication from a lubrication fitting 94 (shown in FIG. 1) to the collar 34 side of the annular groove 86 where the annular groove 86 intersects the plane defined by shaft axis 38 and the first yoke axis 50.

The second bore 90 has two sections 90a, 90b. The first section 90a of the second bore 90 is also in the plane defined by the shaft axis 38 and the first yoke axis 50. The first section 90a slopes radially inwardly at an angle of approximately 70 degrees to the shaft axis 38 from the bridge 68 side of the annular groove 86 where the annular groove 86 intersects the plane defined by the shaft axis 38 and the first yoke axis 50. The second section 90b of the second bore 90 is also in the plane defined by the shaft axis 38 and the first yoke axis 50 and is coaxial with the shaft axis 38 (shown in FIG. 1). The second section 90b extends from the first section 90a through the flat end 65 of the ball 64 and opens to the interior of the tube 60 (shown in FIG. 1).

Lubricant is provided to the interior of the tube 60 of the centering apparatus 56 through the passageway 84. Lubricant is pumped through the fitting 94 into the first bore 88, around the annular groove 86 to the first section 90a of the second bore 90. Continued pumping forces the lubricant down the first section 90a to the second section 90b and then through the second section 90b where it is expelled into the interior of the tube 60.

The lubrication fitting 94 is of a conventional type and includes a one-way check valve (not shown) which admits lubricant into the passageway 84 but does not allow reverse flow out of the passageway 84. However, even if the lubrication fitting 94 would malfunction, work loose, be removed, or be broken off, lubricant would remain in the interior of the tube 60 in the centering apparatus 56. This is because the annular groove 86 acts as a check valve when the joint is operating and keeps lubricant from flowing out of the interior of the tube 60.

Figure 4:
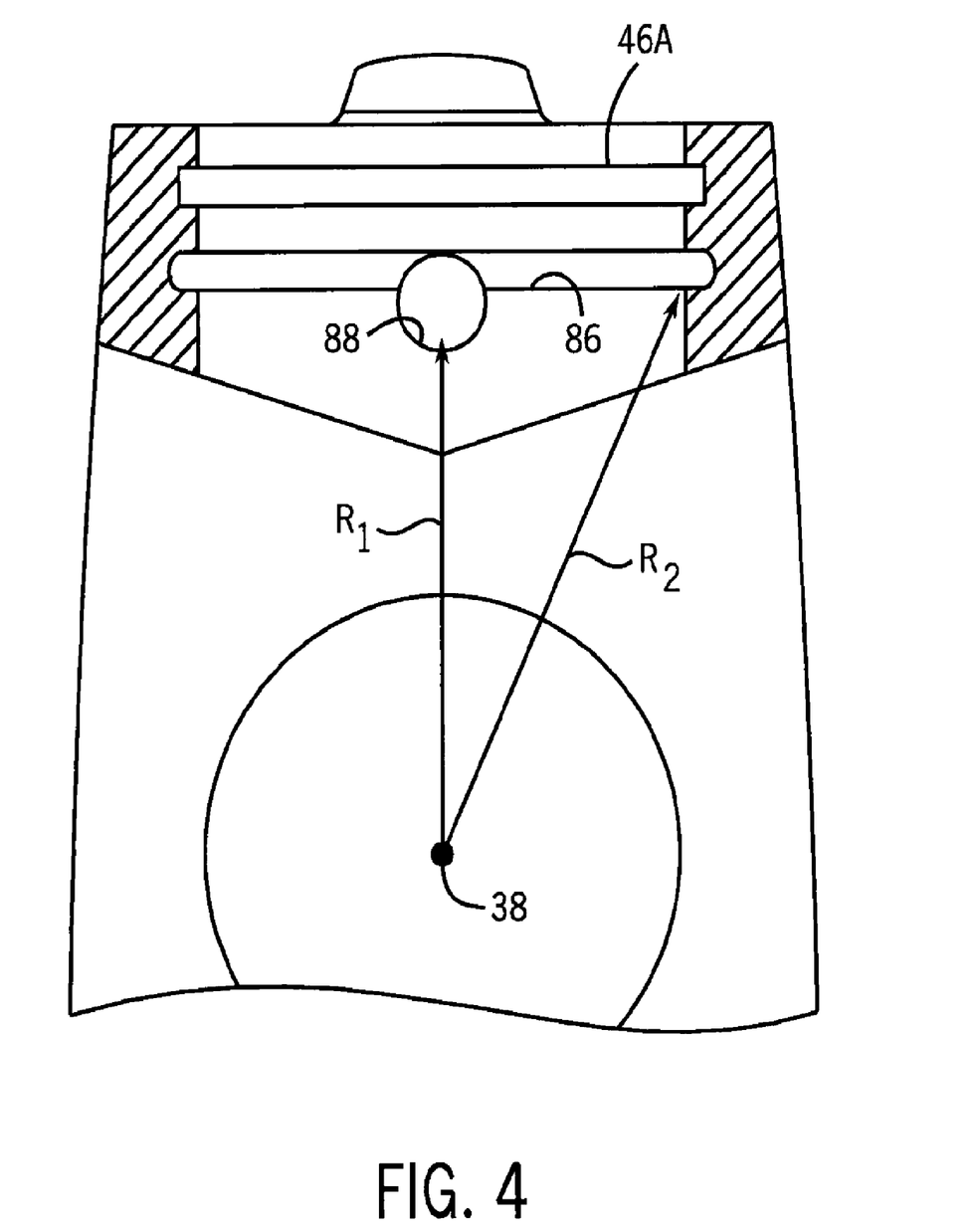
FIG. 4 is a simplified partial section view taken along line 4-4 of FIG. 3.

Referring to FIG. 4, the radial distance from the shaft axis 38 to the annular groove 86 increases from the distance R1, which is equal to the distance from the shaft axis 38 to the bridge 68 side of the annular groove 86 at the angular position of point S in FIG. 2. This position is where the annular groove 86 intersects the plane defined by the shaft axis 38 and the first yoke axis 50. This radial distance increases to a maximum distance R2, which is the distance from the shaft axis 38 to the annular groove 86 at the angular position of either point T or point U in FIG. 2. Theses positions are where the annular groove 86 intersects a plane including the first yoke axis 50 and which is perpendicular to the plane defined by the shaft axis 38 and the first yoke axis 50. From either of these points toward the collar 34, the radial distance decreases to the minimum distance R1 at the angular position of point V in FIG. 2. This position is where the collar 34 side of the annular groove 86 intersects the plane defined by the shaft axis 38 and the first yoke axis 50. Note that as used herein, "bridge side" means the full 180 degree arc of the annular groove 86 to the right of a line through points T and U, and "collar side" means the full 180 degree arc if the annular groove 86 which is to the left of a line through points T and U, as viewed in FIG. 2.

This construction results in the centrifugal force gradient acting on the lubricant being increasing around the annular groove 86 from point S to either point T or U. However, from either point T or U to point V, the gradient is decreasing. Thus, in operation, centrifugal force impedes flow of lubricant past points T and U toward the collar to help keep lubricant in the tube 60 where it lubricates the slideable connection between the balls 64, 66 and the interior of the tube 60.

In this construction, the volume inside the tube 60 between the balls 64, 66, which is in the ball lubrication envelope to which grease is supplied through fitting 94, changes considerably as the angle between the two yoke axes 38 and 40 changes. At large angles the envelope volume is greatest and at no angle, when the axes 38 and 40 are aligned, the volume is at its smallest. At high angles, a vacuum is created in the envelope which tends to pull grease into the tube 60, and also to some extent sucks air into the tube. A change to a low angle increases the pressure in the tube, which drives grease and air out. In this construction, the centrifugal two-way "check valve" provided by the annular groove 86 permits expansion and contraction of the volume of grease in the tube 60 as the joint is angulated, while at the same time inhibiting flow through it in both directions while the joint is rotating.

Figure 5:
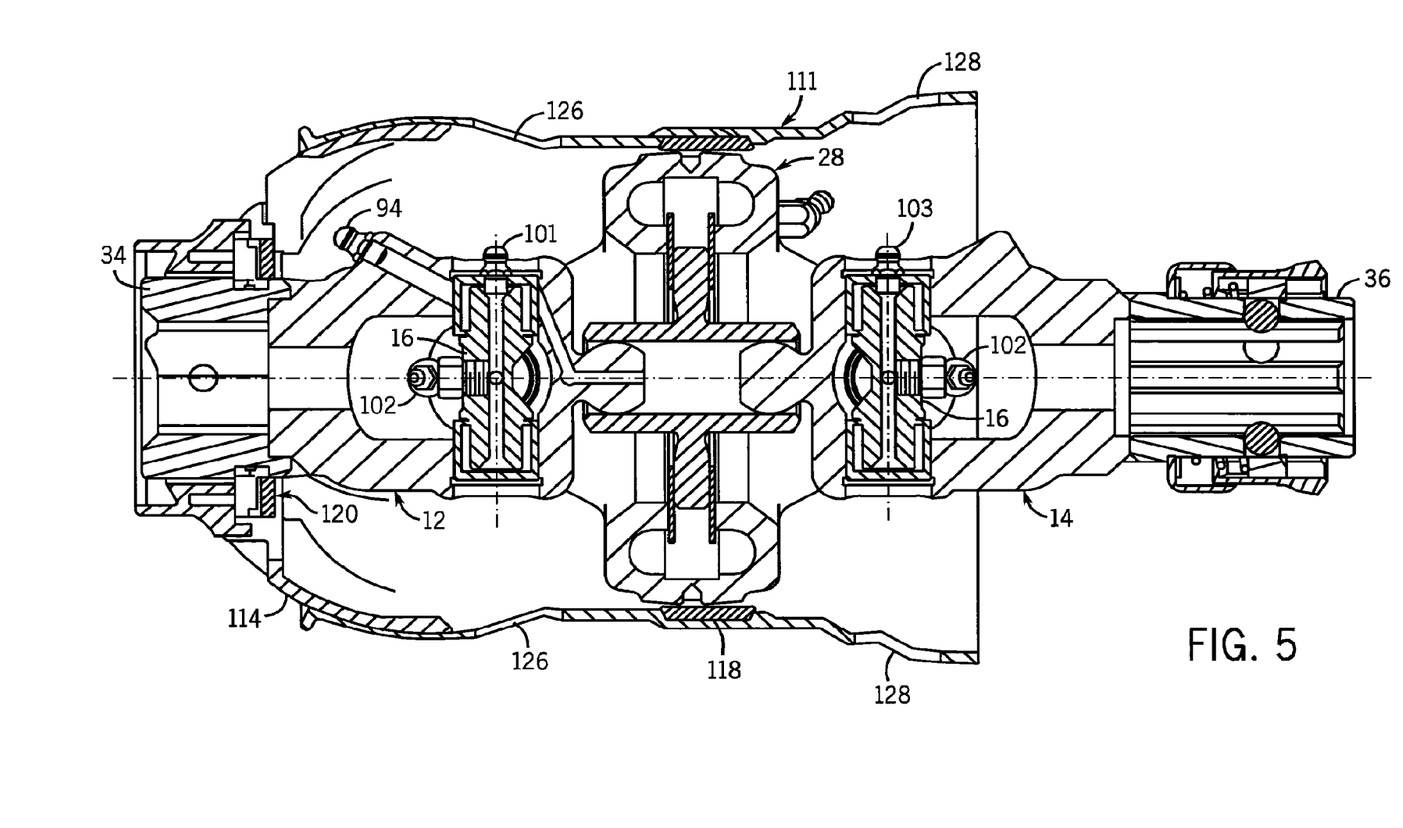
FIG. 5 is a section view of a similar joint illustrated together with a shield.
Figure 6:
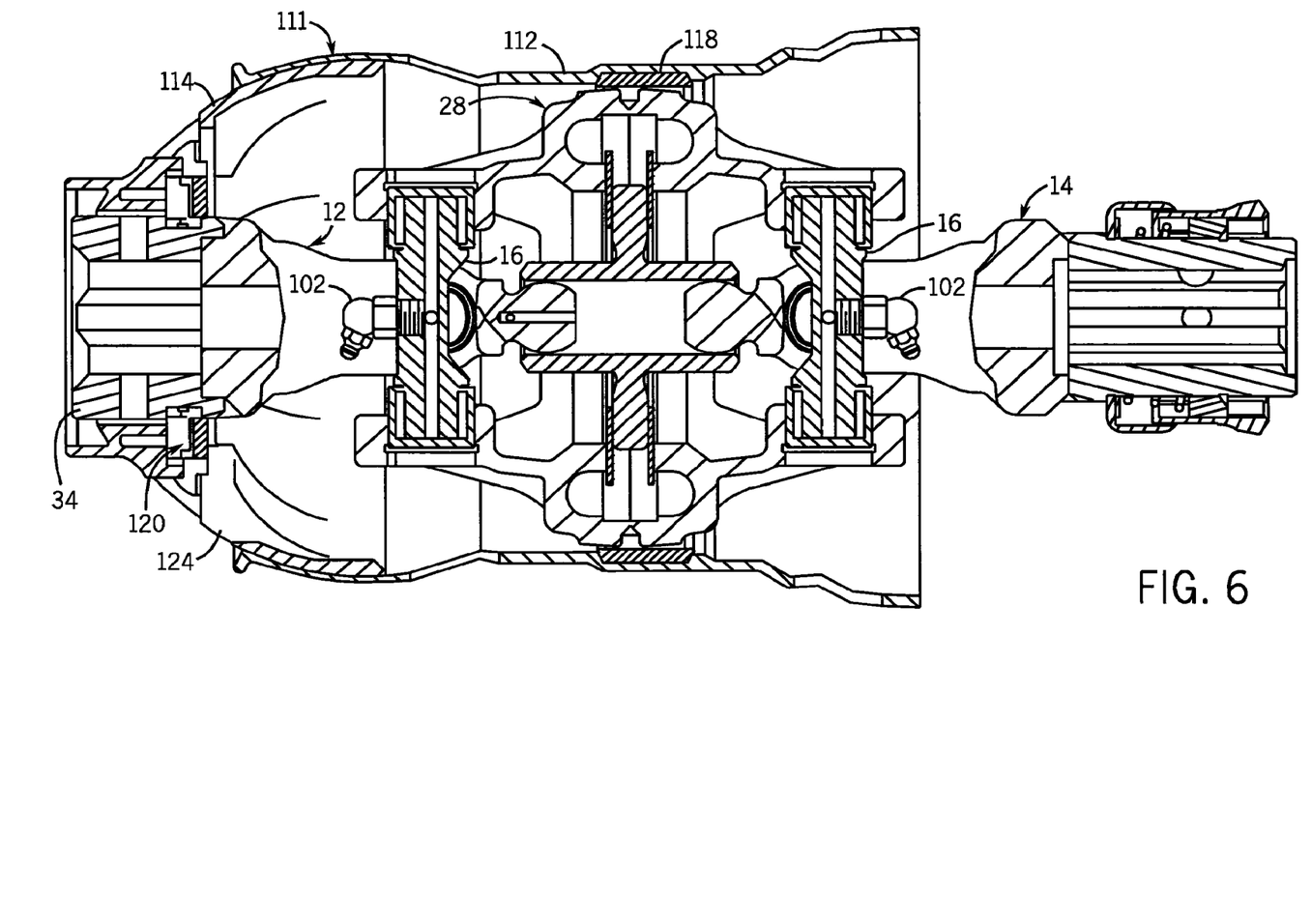
FIG. 6 is a section view of the joint and shield of FIG. 5 from a plane that is 90 degrees to the plane of FIG. 5.

FIGS. 5 and 6 illustrate a similar joint, shown with additional zerks 101 and 103 at ends of the cross 16 arms for a different option for injecting grease into the cross member 16, and showing a shield 111 that is closed at one end and open at the other. The open end goes toward the master shield on the tractor and therefore is substantially closed by the master shield, and the other end is closed by the shield 111. The shield 111, is provided by a sleeve member 112 and a bell member 114, that is part spherical and received in close sliding contact with part spherical surface 116 of the sleeve member 112. A bearing 118 journals sleeve member 112 on the outer diametral perimeter of the housing 28 and a bearing 120 journals the bell member 114 in a groove of the collar 34.

The bell member has one or more holes 124 for accessing the zerk 102 at that end of the joint and the shield member 112 has one or more holes 126 and 128 for accessing the respective zerks 101 and 103. The zerk 102 at the open end can be accessed through the large end opening of the shield 111. The zerk 94 at the bell member 114 end of the housing 28 is accessed through one or more holes 130 in the bell member 114. The shield 111 and bearings 118, 120 can be made of any suitable materials, for example plastic, with the shield members being an impact resistant plastic and the bearings having good lubricity and wear characteristics.

The shield 111 provides the first level of defense in keeping dust, dirt and other debris out of the universal joint. This is particularly important with a ball-in-tube and sliding centering plate centering apparatus as illustrated in the preferred embodiment because of the significant area of sliding surfaces where debris can wreak havoc. Thus, the shield 111 in conjunction with the tractor master shield substantially encloses the universal joint except for the relatively small lubrication access holes.

A preferred embodiment of the invention has been described in considerable detail. Many modifications and variations to the preferred embodiment described will be apparent to a person of ordinary skill in the art. Therefore, the invention should not be limited to the embodiment described.

I claim:

1. In a universal joint, having:
   a first yoke with a first axis of rotation;
   a second yoke with a second axis of rotation;
   a housing pivotally connecting the yokes with a pair of cross members, one for each yoke;
   a centering plate orbitally mounted in the housing between the yokes and slideably connected to an end of each yoke;
   a lubrication passageway comprising:
      an arcuate groove in the first yoke, the groove being in a first plane which is spaced apart from the first axis of rotation and is perpendicular to an imaginary line which is normal to the first axis of rotation, the arcuate groove having an entry portion on one side of a second plane which is normal to the first axis of rotation and which intersects the groove where the groove is farthest from the first axis of rotation and the groove having an exit portion on the other side of the second plane;
      a first passageway in communication with one of the portions for providing lubricant to the groove, the portion being the entry portion; and
      a second passageway in communication with and extending radially inward from the other one of the portions for directing lubricant from the groove to a sliding surface radially inward from the groove, the portion being the exit portion;
   wherein the centrifugal force gradient increases from any point in the groove where the second passageway is in communication with the groove to any point in the groove where the groove is farthest from the first axis of rotation; and
   wherein lubricant is admitted to the universal joint through the groove from the entry portion to the exit portion and then to the second passageway such that backflow through the second passageway due to centrifugal force is impeded by the groove;
   wherein the improvement comprises:
      each yoke has a bridge joining arms and a ball head at an inward end of the yoke extending from the bridge;
      the centering plate has a tube in which the ball heads of the yokes are slideably received to establish the slideable connection between the ends of the yokes and the centering plate;
      the lubrication passageway has a lubrication bore in communication with the second passageway and extending through the bridge and the ball of the first yoke; and
      wherein the lubricant is supplied from the second passageway through the lubrication bore to an interior of the tube.

2. The universal joint of claim 1, further comprising:
   a bore formed in the first yoke;
   a recess formed in the bore;
   a bearing press fitted in the bore; and
   wherein the groove is defined between the bearing and the recess.

3. The universal joint of claim 1, further comprising:
   a shield including a bell member and a sleeve member, with the bell member substantially closing one end of the shield and articulated to the sleeve member by mating part spherical surfaces between the bell member and the sleeve member, a bearing between the sleeve member and an outer perimeter of the housing and a bearing between the bell member and the first yoke.

4. The universal joint of claim 3, wherein the shield has at least one hole in it for accessing a lubrication fitting of the universal joint.

* * * * *